United States Patent
Lota

(10) Patent No.: US 7,731,254 B2
(45) Date of Patent: Jun. 8, 2010

(54) MOTOR VEHICLE CENTER CONSOLE ASSEMBLY HAVING A CONTAINER ASSEMBLY WITH A FLUSH DOOR

(75) Inventor: Charan Singh Lota, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 39 days.

(21) Appl. No.: 11/971,352

(22) Filed: Jan. 9, 2008

(65) Prior Publication Data

US 2009/0174208 A1 Jul. 9, 2009

(51) Int. Cl.
*B60R 13/00* (2006.01)
(52) U.S. Cl. .................... 296/24.34; 248/311.2
(58) Field of Classification Search ............ 296/24.34, 296/37.1, 37.8, 37.12, 37.6, 37.13; 49/386
See application file for complete search history.

(56) References Cited

U.S. PATENT DOCUMENTS

| | | | | |
|---|---|---|---|---|
| 4,930,737 | A * | 6/1990 | McNeill | 296/37.12 |
| 5,116,099 | A * | 5/1992 | Kwasnik et al. | 297/188.15 |
| 5,190,259 | A * | 3/1993 | Okazaki | 248/311.2 |
| 5,289,962 | A * | 3/1994 | Tull et al. | 224/549 |
| 5,478,126 | A * | 12/1995 | Laesch | 292/87 |
| 5,516,191 | A * | 5/1996 | McKee | 297/188.15 |
| 5,520,313 | A * | 5/1996 | Toshihide | 224/539 |
| 5,603,540 | A * | 2/1997 | Shibao | 292/341.15 |
| 5,620,122 | A * | 4/1997 | Tanaka | 224/275 |
| 5,639,002 | A * | 6/1997 | Weitbrecht et al. | 224/539 |
| 5,680,974 | A * | 10/1997 | Vander Sluis | 224/281 |
| 5,713,623 | A * | 2/1998 | Mattingly | 296/37.7 |
| 5,718,405 | A * | 2/1998 | Adachi | 248/311.2 |
| 5,863,089 | A * | 1/1999 | Ignarra et al. | 296/37.8 |
| 6,019,334 | A * | 2/2000 | Shinomiya | 248/311.2 |
| 6,065,729 | A * | 5/2000 | Anderson | 248/311.2 |
| 6,206,260 | B1 * | 3/2001 | Covell et al. | 224/539 |
| 6,276,737 | B1 * | 8/2001 | Cansfield et al. | 296/37.8 |
| 6,470,627 | B2 * | 10/2002 | Fukuo | 49/260 |
| 6,527,325 | B2 * | 3/2003 | Steingrebe et al. | 296/37.7 |
| 6,644,705 | B2 * | 11/2003 | Wikman et al. | 296/24.34 |
| 6,685,152 | B2 * | 2/2004 | Shirase et al. | 248/311.2 |
| 6,701,868 | B1 * | 3/2004 | Shepherd | 119/166 |
| 6,702,352 | B2 * | 3/2004 | Nakanishi et al. | 296/24.34 |
| 6,715,727 | B2 * | 4/2004 | Sambonmatsu | 248/311.2 |
| 6,719,344 | B2 * | 4/2004 | Ono et al. | 296/24.34 |
| 6,749,079 | B2 * | 6/2004 | Katagiri et al. | 220/345.2 |
| 6,789,831 | B2 * | 9/2004 | Schmidt et al. | 296/37.13 |

(Continued)

*Primary Examiner*—Kiran B. Patel
(74) *Attorney, Agent, or Firm*—Gifford, Krass, Sprinkle, Anderson & Citkowski, P.C.

(57) ABSTRACT

A container assembly for use in a passenger compartment of a motor vehicle includes a housing having a storage space. The housing has an outer surface and an opening formed in the outer surface providing access to the storage space. The container assembly also includes a door movably coupled to the housing for movement between a closed position covering the opening and preventing access to the storage space and an open position disposed below the outer surface to reveal the opening and allow access to the storage space. This allows the container assembly to slide beneath a bin lid of a center console when the door of the container assembly is in either the closed position or the open position without interfering with the bin door.

9 Claims, 5 Drawing Sheets

U.S. PATENT DOCUMENTS

| | | | |
|---|---|---|---|
| 6,808,097 B2 * | 10/2004 | Kim et al. .................... 224/483 |
| 6,820,921 B2 * | 11/2004 | Uleski ......................... 296/152 |
| 6,854,778 B2 * | 2/2005 | Lee ........................ 296/37.12 |
| 6,883,680 B2 * | 4/2005 | Hirose ......................... 220/830 |
| 7,025,225 B2 * | 4/2006 | Inari ........................... 220/830 |
| 7,063,225 B2 * | 6/2006 | Fukuo ......................... 220/264 |
| 7,168,750 B2 * | 1/2007 | Hutek et al. ............... 296/37.8 |
| 7,188,896 B2 * | 3/2007 | Embach ................... 297/217.4 |
| 7,216,912 B2 * | 5/2007 | Takeshima ................ 296/37.1 |
| 7,226,029 B2 * | 6/2007 | Hoshi ..................... 248/311.2 |
| 7,231,692 B2 * | 6/2007 | Harada ........................ 16/345 |
| 7,243,970 B2 * | 7/2007 | Kogami ..................... 296/37.8 |
| 7,451,888 B2 * | 11/2008 | Tanaka ....................... 220/263 |
| 7,527,166 B2 * | 5/2009 | Kondo ........................ 220/825 |
| 2003/0071047 A1 | 4/2003 | Harada |
| 2003/0080593 A1 * | 5/2003 | Walkinshaw et al. ... 297/188.01 |
| 2004/0036304 A1 * | 2/2004 | Thompson et al. .......... 296/1.02 |
| 2004/0195855 A1 * | 10/2004 | Takeshima ................. 296/37.1 |
| 2005/0282599 A1 * | 12/2005 | Hehn ....................... 455/575.8 |
| 2006/0037984 A1 * | 2/2006 | Misumi ....................... 224/282 |
| 2006/0290144 A1 * | 12/2006 | Nakaya ....................... 292/262 |
| 2007/0119885 A1 * | 5/2007 | Miller et al. ................. 224/275 |
| 2007/0230099 A1 | 10/2007 | Turner et al. |

* cited by examiner

MOTOR VEHICLE CENTER CONSOLE ASSEMBLY HAVING A CONTAINER ASSEMBLY WITH A FLUSH DOOR

FIELD OF THE INVENTION

The invention relates to a center console assembly for a motor vehicle. More particularly, the invention relates to a container assembly of the center console assembly with a flush door that allows the container assembly to slide beneath a bin door of the center console assembly.

BACKGROUND OF THE INVENTION

Motor vehicles typically include bins, compartments and containers located throughout the passenger compartment for storing such items. As vehicle owners carry an ever increasing plurality of accessories and gadgets, such as coins, pens, phones, music players, GPS receivers, satellite radios, personal digital assistants and the like, vehicle manufacturers are, in response to this trend, striving to design storage to manage these accessories within the passenger compartment.

It remains desirable to provide improved bin and container storage in the passenger compartment to address to the growing needs of potential new vehicle buyers.

SUMMARY OF THE INVENTION

According to one aspect of the invention, a container assembly is provided for use in a passenger compartment of a motor vehicle. The container assembly includes a housing having a storage space. The housing has an outer surface and an opening formed in the outer surface providing access to the storage space. The container assembly also includes a door movably coupled to the housing for movement between a closed position covering the opening and preventing access to the storage space and an open position disposed below the outer surface to reveal the opening and allow access to the storage space.

According to another aspect of the invention, a center console assembly includes a bin having generally upright and spaced apart side walls. The bin has a bin storage space extending between the side walls. A bin door is pivotally coupled to the bin for movement between a generally horizontal shut position covering the bin storage space and a generally upright open position allowing access to the bin storage space. The container assembly is slidably supported along a top end of the side walls. The container assembly is slidable beneath the bin door while the bin door is in the shut position. The door of the container assembly remains flush or below the outer surface of the housing so as to not interfere with the bin door as the container assembly is moved beneath the bin door in the shut position.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
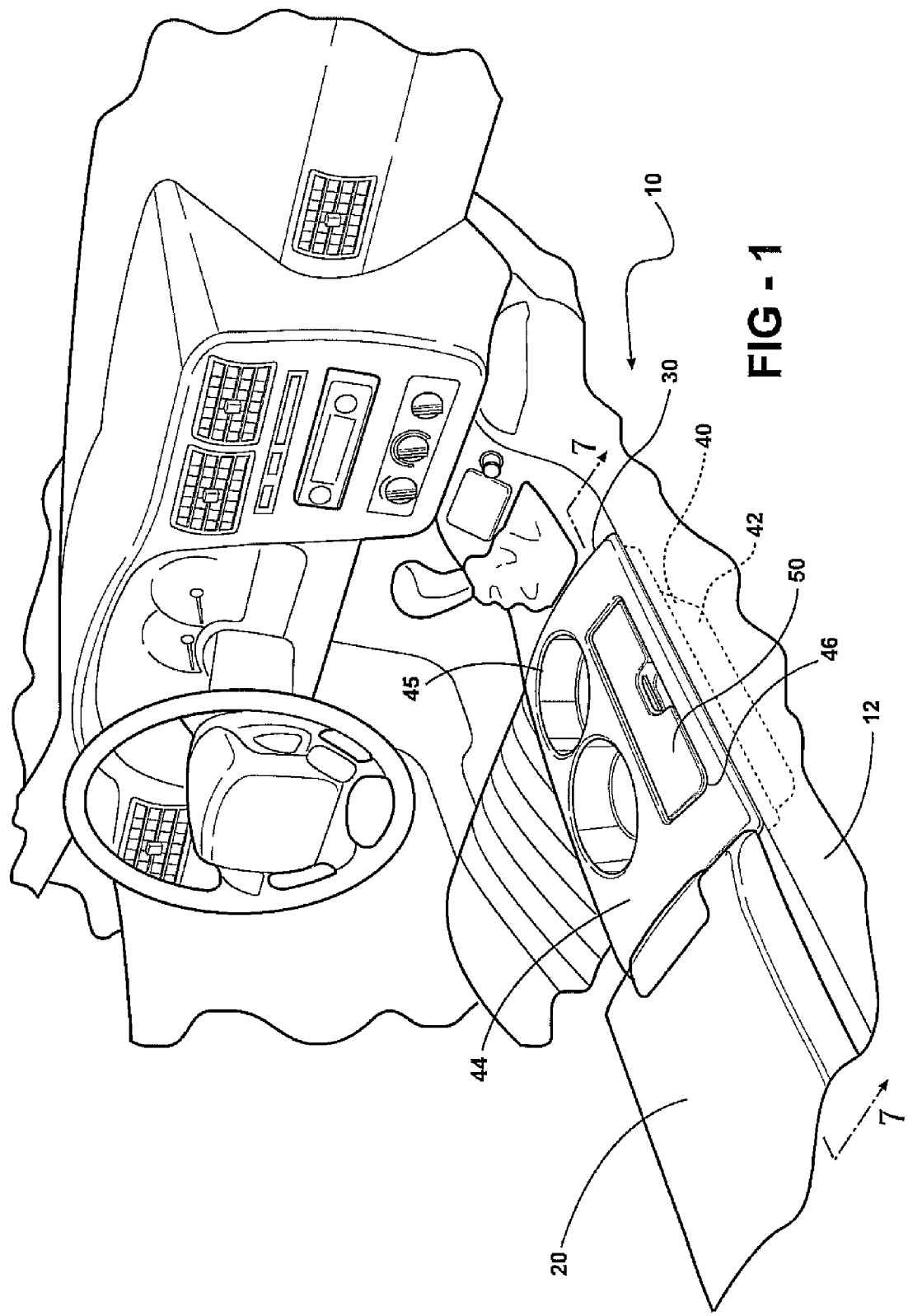
FIG. 1 is a perspective view of a center console assembly in a passenger compartment of a motor vehicle according to the invention.
Figure 2:
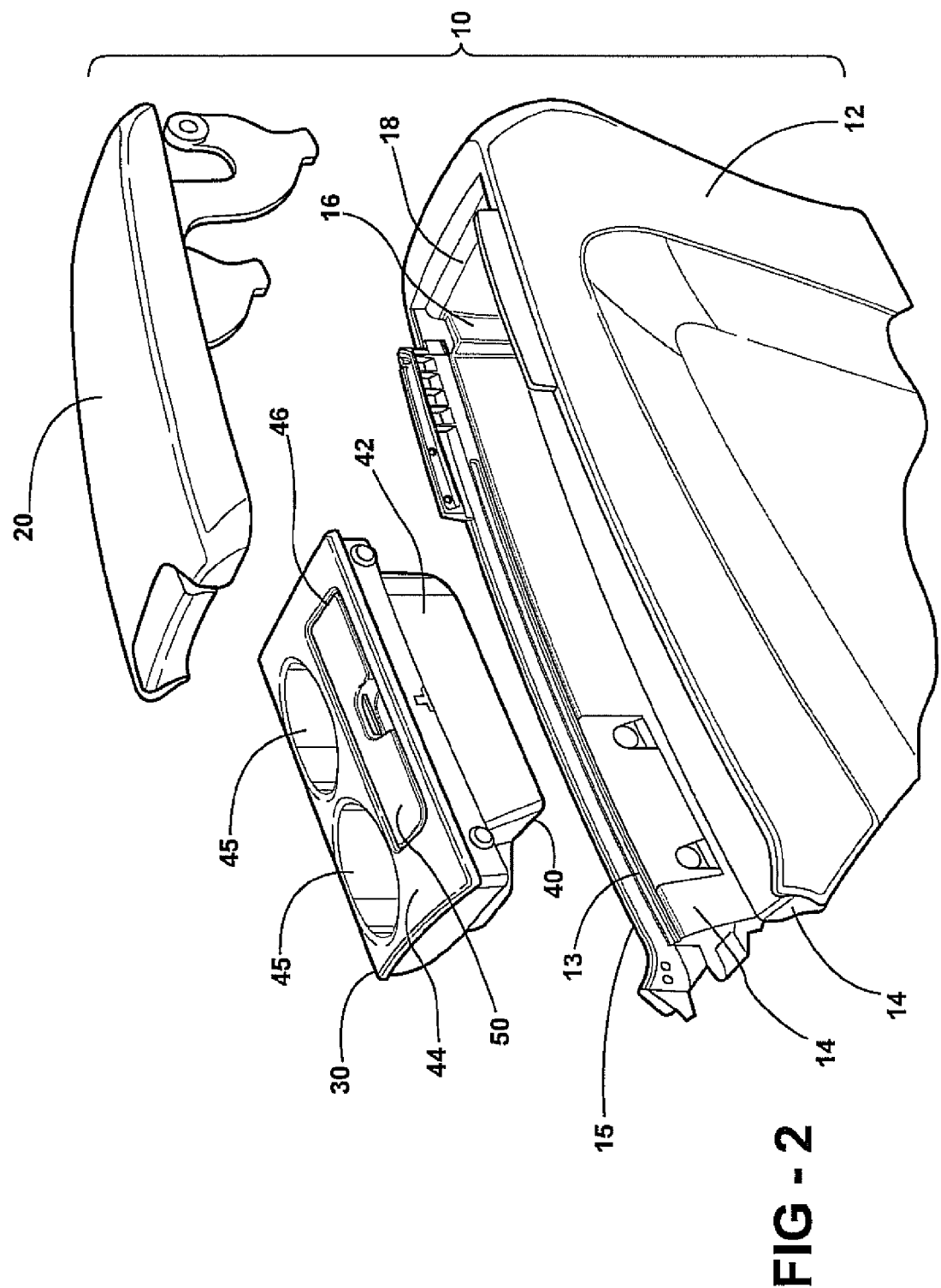
FIG. 2 is an exploded perspective view of a portion of the center console assembly.
Figure 3:
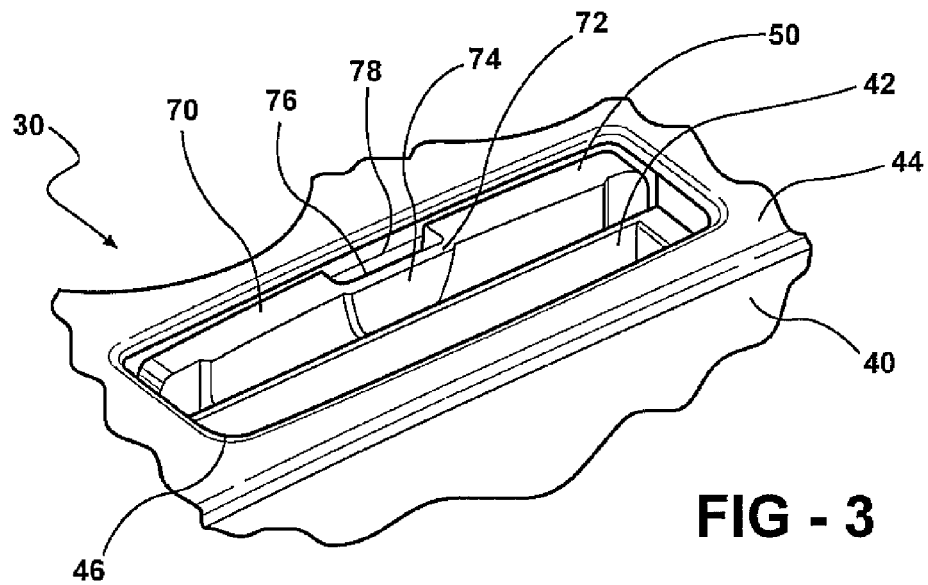
FIG. 3 is an enlarged perspective view of a portion of a container assembly of the center console assembly according to the invention.
Figure 4:
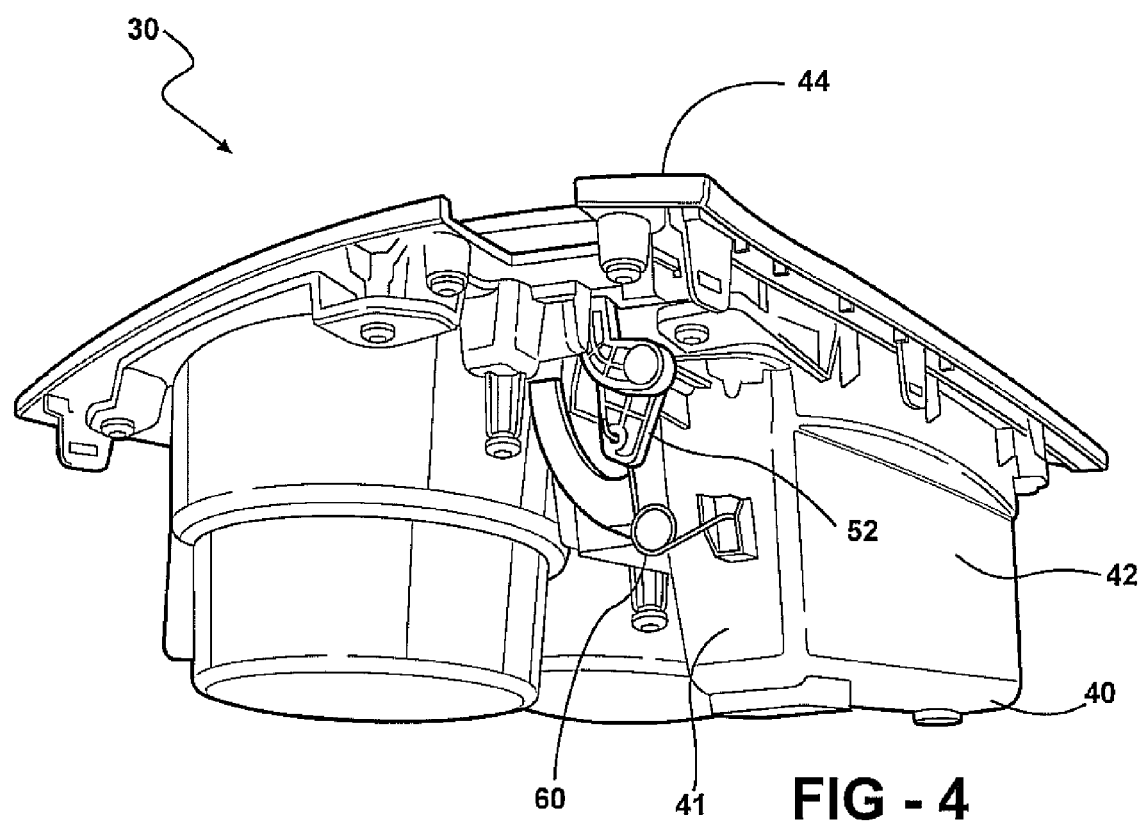
FIG. 4 is a bottom perspective view of the container assembly.
Figure 6:
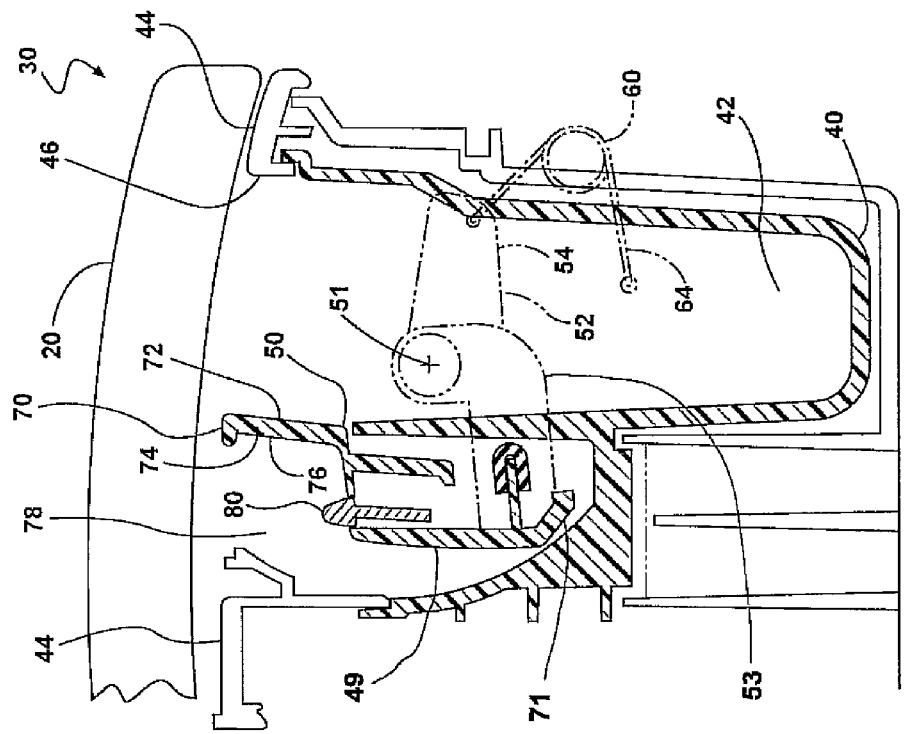
FIG. 6 is a cross sectional view of the container assembly with the door in the open position.
Figure 5:
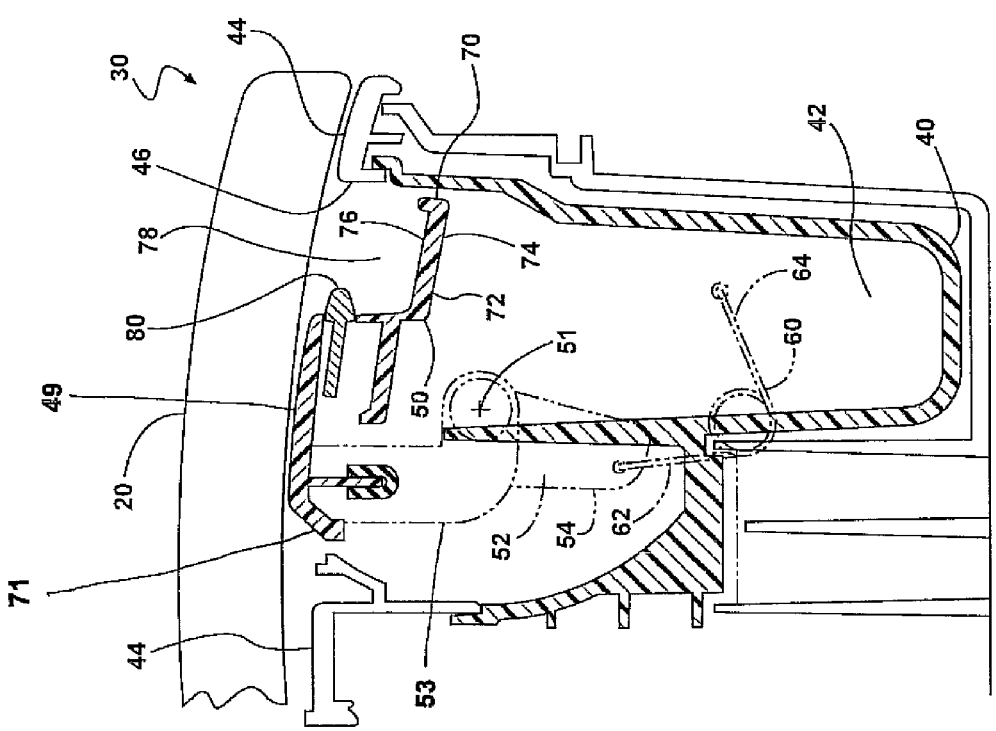
FIG. 5 is a cross sectional view of the container assembly with the door in the closed position.

Referring to FIGS. 1, a center console assembly according to one embodiment of the invention is generally indicated at 10. The center console assembly 10 includes a bin 12 having generally upright and spaced apart side walls 14. The bin 12 has a bin storage space 16 extending between the side walls 14. A bin door 20 is movably coupled to a transversely extending end wall 18 of the bin 12 and movable between a generally horizontal shut position covering the bin storage space 16 and a generally upright open position allowing access to the bin storage space 16. Described in greater detail below, the center console assembly 10 also includes a container assembly 30 slidably supported along rails 13 disposed along a top end 15 of each of the side walls 14. The container assembly 30 is slidable beneath the bin door 20 and does not interfere with the bin door 20 even when the bin door 20 is shut.

Figure 7:
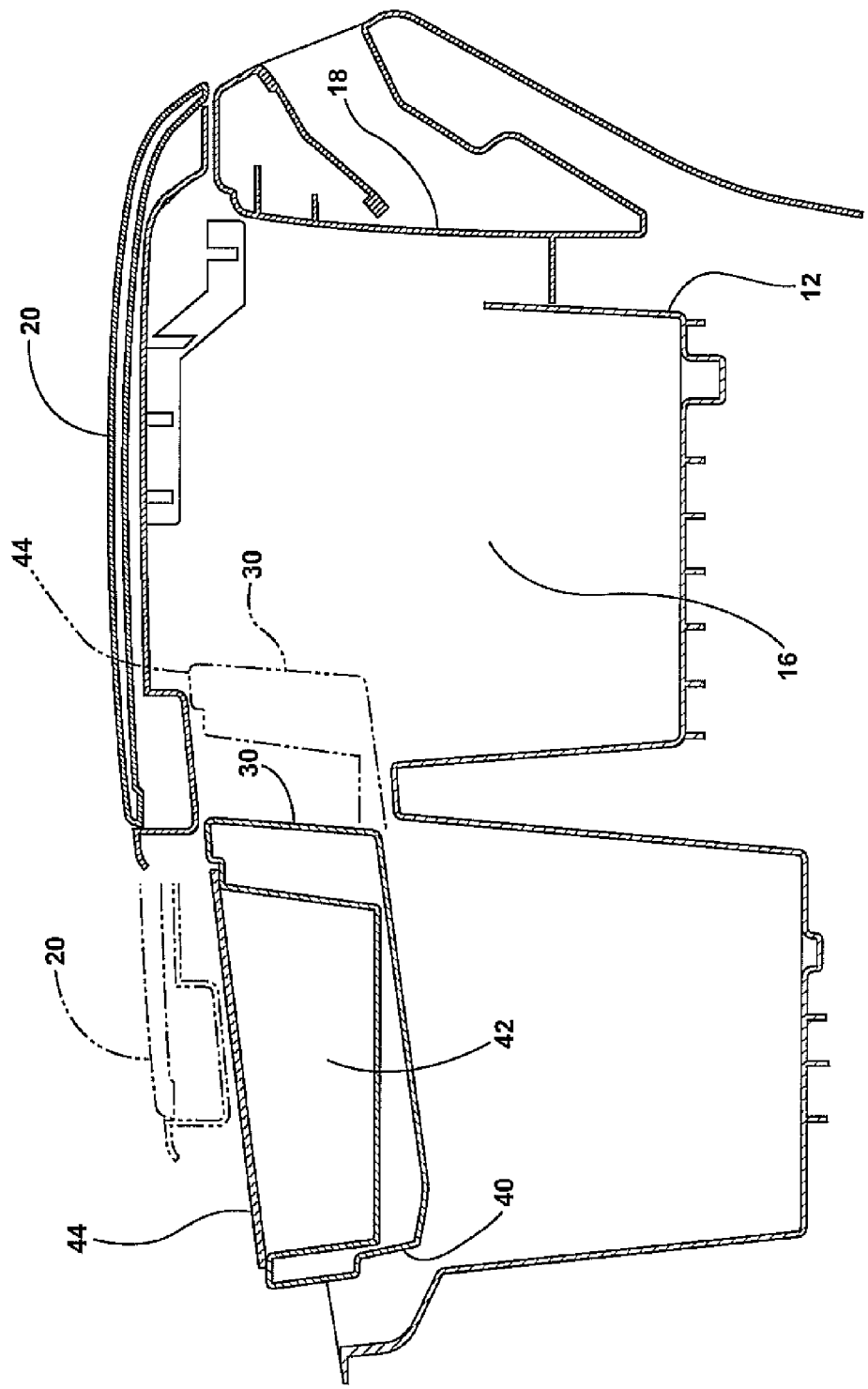
FIG. 7 is a cross sectional view of the center console assembly showing various positions of a sliding bin door and the container assembly.

Referring to FIGS. 2-7, the container assembly 30 includes a housing 40 having a storage space 42. The housing 40 has an outer surface 44 and an opening 46 formed in the outer surface 44 providing access to the storage space 42. The container assembly 30 also includes a door 50 having a outer surface 49, a leading end 70, and an opposite pivot end 71, and pivotally coupled to the housing 40 for movement about a door pivot 51, which extends from an exterior side wall 41 of the housing 40, between a closed position (FIG. 5) substantially covering the opening 46 and preventing access to the storage space 42 and an open position (FIG. 6) to reveal the opening 46 and allow access to the storage space 42. To accommodate the sliding movement of the container assembly 30 beneath the bin door 20 while the bin door 20 is shut, the outer surface 49 of the door 50 extends coextensively with the outer surface 44 of the housing 40 so as to be at least flush with the outer surface 44 of the housing 40 while in the closed position and the leading end 70 is disposed below the outer surface 44 of the housing 40 while in the open position. The sliding movement of the container assembly 30 beneath the bin door 20 is best illustrated in FIG. 7.

A biasing member 60 is operatively coupled to the housing 40 and the door 50 for biasing the door 50 toward either the closed position or the open position. More specifically, the door 50 of the container assembly 30 includes a first arm 53 extending from the pivot end 71 of the door 50 and a second arm 52 extending generally radially outwardly from the door pivot 51. The first arm 53 is pivotally coupled to the fixed door pivot 51. The biasing member 60 is a helical turn over spring having one end 62 coupled to a distal end 54 of the second arm 52 and an opposite end 64 coupled to the exterior side wall 41 of the housing 40.

The door 50 includes a leading end 70 that remains accessible in either of the closed and open positions of the door 50. A stepped portion 72 is formed along the leading end 70 of the door 50 and defines a recess 78 to accommodate a user's fingers to facilitate urging of the door 50 from either the closed position or the open position. The stepped portion 72 includes a bottom wall 74 with a top surface 76 that is accessible through the opening 46 by a user when the door 50 is in the open position to facilitate urging of the door 50 toward the closed position. The door 50 also includes a lip 80 that extends inwardly toward the recess 78 that is spaced apart from the top surface 76 of the bottom wall 74 to provide a grip to facilitate urging of the door 50 from the closed position toward the open position. The lip 80 remains below the outer surface 44 when the door 50 is in either the closed or open positions.

The invention has been described in an illustrative manner. It is, therefore, to be understood that the terminology used is intended to be in the nature of words of description rather than of limitation. Many modifications and variations of the invention are possible in light of the above teachings. For example, the container assembly 30 may also include cup holder openings 45 for receiving and supporting beverage containers. Or, the opening 46 and door 50 may be shaped other than as shown, such as square or ovular, depending on the particular application of the container assembly. Thus, within the scope of the appended claims, the invention may be practiced other than as specifically described.

I claim:

1. A container assembly for use in a passenger compartment of a motor vehicle, said container assembly comprising:
    a housing having a storage space, the housing having an outer surface and an opening formed in the outer surface providing access to the storage space;
    a door having an outer surface, a pivot end and an opposite leading end, the door being movably coupled to the housing for movement between a closed position covering the opening wherein the outer surface of the door extends coextensively with the outer surface of the housing preventing access to the storage space and an open position wherein the leading end is disposed below the outer surface to reveal the opening and allow access to the storage space.

2. The container assembly as set forth in claim 1 including a biasing member operatively coupled to the housing and the door for biasing the door toward either the closed position or the open position.

3. The container assembly as set forth in claim 1, wherein the door includes a first arm extending from the pivot end of the door, the first arm being pivotally coupled to a fixed pivot extending from an exterior side wall of the housing.

4. The container assembly as set forth in claim 3, wherein the door includes a second arm extending generally radially outwardly from the fixed pivot.

5. The container assembly as set forth in claim 4, wherein the biasing member is a helical turn over spring having one end coupled to a distal end of the second arm and an opposite end coupled to the exterior side wall of the housing.

6. The container assembly as set forth in claim 1, wherein the leading end remains accessible through the opening in either of the closed and open positions of the door.

7. The container assembly as set forth in claim 6, wherein the leading end of the door includes a stepped portion having a bottom wall with a top surface that is accessible through the opening by a user when the door is in the open position to facilitate urging of the door toward the closed position.

8. The container assembly as set forth in claim 7, wherein the stepped portion defines a recess to accommodate a user's fingers to facilitate urging of the door from the closed position toward the open position.

9. The container assembly as set forth in claim 8, wherein the door includes a lip extending inwardly toward the recess and being spaced apart from the bottom wall to provide a grip to facilitate urging of the door from the closed position toward the open position, the lip being below the outer surface when the door is in the closed position.

\* \* \* \* \*